(12) United States Patent
Xia et al.

(10) Patent No.: US 12,405,813 B2
(45) Date of Patent: Sep. 2, 2025

(54) DEVICE ONBOARDING ASSURANCE

(71) Applicant: Hewlett Packard Enterprise Development LP, Spring, TX (US)

(72) Inventors: Longping Xia, Fremont, CA (US); Hao Lu, Fremont, CA (US); Vivek Batra, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 12 days.

(21) Appl. No.: 18/481,019

(22) Filed: Oct. 4, 2023

(65) Prior Publication Data

US 2025/0117235 A1   Apr. 10, 2025

(51) Int. Cl.
*G06F 15/173* (2006.01)
*G06F 9/455* (2018.01)
*G06F 11/26* (2006.01)
*H04L 43/065* (2022.01)

(52) U.S. Cl.
CPC ............ *G06F 9/455* (2013.01); *G06F 11/261* (2013.01); *H04L 43/065* (2013.01)

(58) Field of Classification Search
None
See application file for complete search history.

(56) References Cited

U.S. PATENT DOCUMENTS

| | | | |
|---|---|---|---|
| 10,033,604 B2 | 7/2018 | Maes et al. | |
| 10,574,512 B1 | 2/2020 | Mermoud et al. | |
| 10,601,956 B2 | 3/2020 | Nucci et al. | |
| 2014/0297356 A1 | 10/2014 | Jayade | |
| 2018/0240096 A1* | 8/2018 | Patel | H04W 76/15 |
| 2020/0099709 A1 | 3/2020 | Vasseur et al. | |
| 2020/0234515 A1 | 7/2020 | Gronsbell et al. | |
| 2021/0092026 A1 | 3/2021 | Di Pietro | |

(Continued)

OTHER PUBLICATIONS

Aruba, "AOS-CX Central Onboarding and ZTP Workflows", May 12, 2023, 11 pages. (Year: 2023).*

(Continued)

*Primary Examiner* — Wing F Chan
*Assistant Examiner* — Andrew Woo
(74) *Attorney, Agent, or Firm* — Yao Legal Services, Inc.

(57) ABSTRACT

One aspect can provide a system and method for emulating the onboarding of networking devices. During operation, a computing device can obtain from a device-activation platform a list of networking devices to be onboarded to a device-management platform method. For a respective networking device on the list of networking devices, the system can collect hardware and firmware information associated with the respective networking device and emulate an onboarding process of the respective networking device using the collected hardware and firmware information, which comprises exchanging one or more handshake messages with the device-activation platform. In response to failing to receive, from the device-management platform, a confirmation message indicating the emulated onboarding process being successful, the system can perform a diagnostic operation to determine one or more potential issues associated with the onboarding process of the respective networking device and display, on a user interface, outcome of the diagnostic operation.

20 Claims, 6 Drawing Sheets

(56) References Cited

U.S. PATENT DOCUMENTS

2021/0281492 A1* 9/2021 Di Pietro ............... G06N 5/022
2022/0051780 A1   2/2022 Jacobs et al.
2022/0131702 A1   4/2022 Adams et al.

OTHER PUBLICATIONS

Aruba, "SD-Branch Fundamentals Guide Version 1.1.1", Mar. 13, 2019, 229 pages. (Year: 2019).*
Aruba, "AOS-CX Central Onboarding and ZTP Workflows", May 12, 2023, 11 pages.
Aruba, "Provisioning," SD-Branch Fundamentals Guide, Chapter 3, Version 1.1.0, 2018, 14 pages.
Aruba, "User Guide," Aruba Central, 2017, 190 pages.

* cited by examiner

DEVICE ONBOARDING ASSURANCE

BACKGROUND

Field

This disclosure is generally related to a method and system for onboarding a networking device. More specifically, this disclosure is related to the monitoring and debugging of the onboarding process.

BRIEF DESCRIPTION OF THE FIGURES

In the figures, like reference numerals refer to the same figure elements.

DETAILED DESCRIPTION

The rapid development of cloud computing technology has changed the way people store, access, and process data and applications. Rather than relying solely on local servers or personal computing devices, cloud computing harnesses the power of remote servers and networks to deliver a wide range of services over the Internet. In addition to providing storage, computing power, and software, cloud computing can also provide Network as a Service (NaaS) that allows organizations to access and configure network resources as needed, without the need to own, maintain, or invest in physical networking hardware and equipment.

As part of the NaaS solution, equipment vendors can also provide a cloud-based management platform to enterprise users such that each enterprise user can manage a large number (e.g., hundreds or even thousands) of networking devices using the cloud-based management platform. For example, a vendor for wireless local area network (WLAN) devices (e.g., access points or switches) can provide a centralized network management platform to allow enterprise users to have visibility and control of their network.

An enterprise user using the network management platform to manage networking devices (e.g., access points or switches) should first bring these networking devices on board, which can include the initial configuration and provision of the networking devices such that they can interact securely with the network management platform. Onboarding the networking devices can ensure that they can have the appropriate authority and firmware to interact with the network management platform.

To improve user experience (e.g., to reduce the time needed to onboard networking devices), it is desirable to implement Zero Touch Provisioning (ZTP) that can automatically provision a large number of networking devices. The ZTP process may be managed by a device-activation platform, which can receive a configuration request from the networking device and then send an appropriate configuration file to the networking device. In addition to providing ZTP, the activation platform can also be responsible for ensuring that the networking device is installed with the correct and up-to-date firmware. For example, when onboarding a networking device, the device-activation platform can first perform a ZTP process to provision the networking device and then check whether the firmware currently running on the networking device is compatible with the management platform. If so, the activation platform can complete the onboarding process to allow the device to communicate with the management platform. If the networking device is running non-compatible firmware or the device certificate has expired, the networking device is not able to establish a connection to the management platform. In such a situation, the activation platform may facilitate automatic firmware upgrades on the networking device (e.g., by "pushing" the firmware to the networking device or sending a firmware-downloading link to the networking device). Subsequent to upgrading the firmware, the networking device can start communicating with the management platform, and the onboarding process is completed successfully. A successful device onboarding will often result in the management platform sending a confirmation message (e.g., a "Welcome" message) to the networking device. Note that a networking device becomes visible in the management platform only after it has completed the onboarding process.

The device onboarding process may be transparent to users. From the perspective of a user, a networking device can be coupled to the management platform once it is powered on and connected to the network. However, the onboarding of a networking device may not always be successful. Many factors can cause device onboarding failure. For example, issues associated with the user's local network may prevent proper communication between the device and the activation platform, thus causing failed or interrupted ZTP operation. The ZTP service or the firmware upgrade service may experience failure and cannot provision the device or upgrade its firmware properly. In another example, the firmware needs to be upgraded, but the corresponding device image is missing or unlinked in the firmware upgrade service. Domain Name System (DNS) failures may also prevent the networking device from obtaining the correct Uniform Resource Locator (URL) of the activation or management platform. It is also possible that the networking device itself is having issues. When a networking device fails to onboard the management platform, it can be very difficult to pinpoint the exact cause of the failure. To troubleshoot a failed device-onboarding process, a current approach is to organize a debugging meeting that involves both the customer and multiple technical teams from the NaaS provider, such as a team debugging the device, a team debugging the activation platform, and a team debugging the cloud-based management platform. Customer participation is involved to provide direct access to the networking device. Such a troubleshooting process is extremely cumbersome, especially for customers.

To mitigate the burden on customers, the proposed device-onboarding solution described herein can automatically narrow down, responsive to a device-onboarding failure, the possible cause or causes of the failure. More specifically, a device-onboarding emulating system can be implemented to automatically detect and report potential onboarding issues associated with networking devices with reduced customer involvement.

Figure 1:
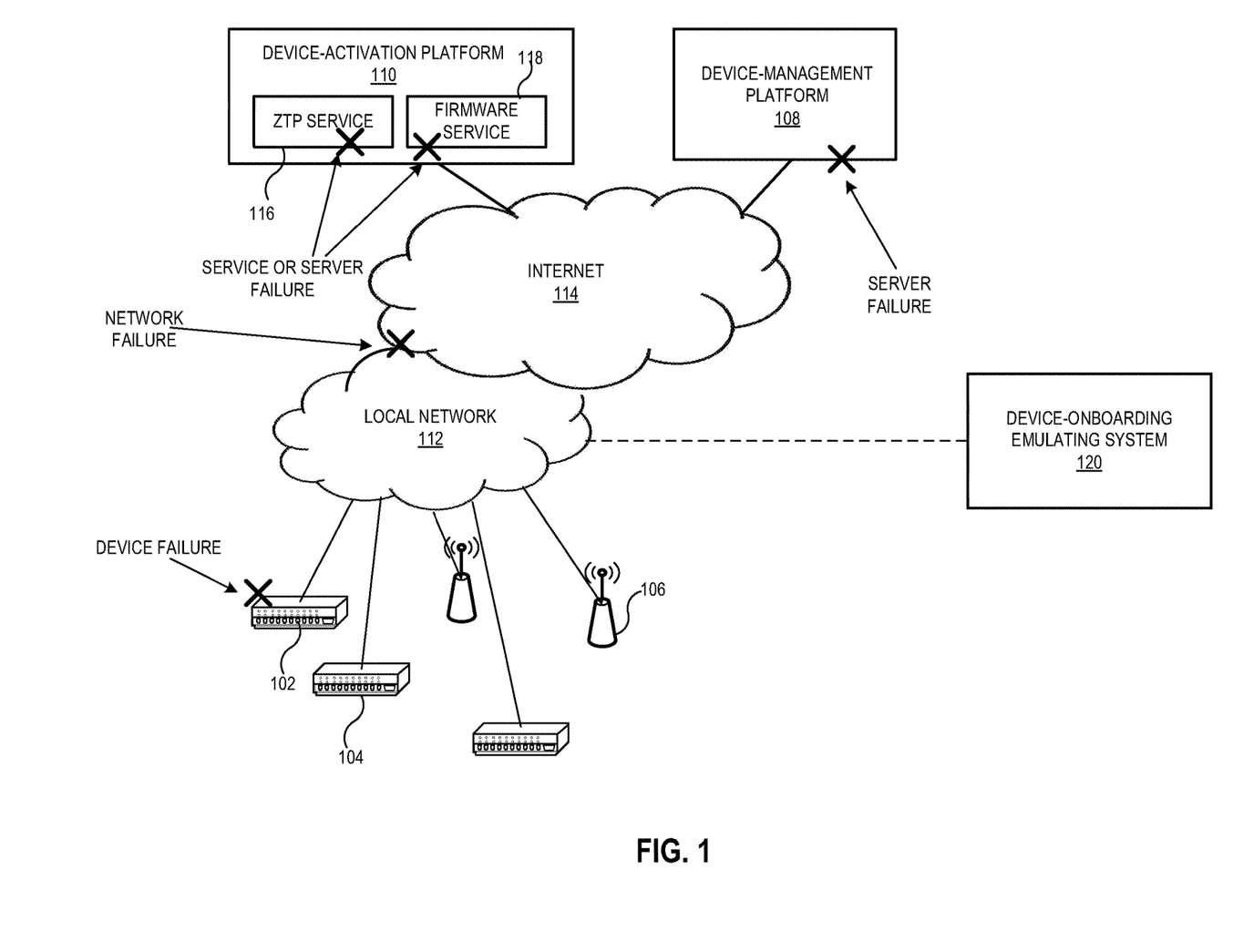
FIG. 1 illustrates an example of a device-onboarding scenario, according to one aspect of the instant application.

FIG. 1 illustrates an example of a device-onboarding scenario, according to one aspect of the instant application. In the example shown in FIG. 1, a number of networking devices (including switches 102 and 104 and AP 106) are to be onboarded to a device-management platform 108 by a device-activation platform 110. More specifically, the networking devices can be coupled to device-management platform 108 and device-activation platform 110 via a local network 112 and Internet 114. Local network 112 can generally include any type of wired or wireless communication channel capable of coupling together computing nodes. In one example, local network 112 can include the customer's intranet.

Device-activation platform 110 can include a ZTP service 116 and a firmware service 118. ZTP service 116 can be responsible for provisioning the networking devices, such as sending device-management software and the URL of device-management platform 108 to the networking devices. Firmware service 118 can be responsible for ensuring that the firmware on each networking device is correct and compatible with device-management platform 108. According to one aspect, firmware service 118 can check the version of the firmware currently running on the networking device. If the firmware is not compatible or if the device certificate has expired due to out-of-date firmware, firmware service 118 can facilitate the downloading of the up-to-date firmware to the networking device.

FIG. 1 also illustrates a number of potential failure points that may lead to the device onboarding failure, indicated by the "X"s. Using the onboarding of switch 102 as an example, one potential failure point can be the device failure on switch 102 (e.g., a hardware failure), and another failure point can be a network failure. Note that the network failure may occur in local network 112, Internet 114, or both. Possible network failures can include gateway failures, address resolution protocol (ARP) failures, or DNS failures. ZTP service 116 or firmware service 118 may also experience failures, which can include service or server failures. For example, the ZTP or firmware server may experience hardware or software failures. In addition, device-management platform 108 may also experience hardware or software failure that can lead to the onboarding failure of switch 102.

As can be seen in FIG. 1, the onboarding failure of a networking device may be caused by any one or any combination of the potential failure points that are scattered throughout the entire network, from the customer site to the public cloud hosting device-management platform 108 and device-activation platform 110. Troubleshooting a failed onboarding process would involve the identification of one or more failure points among all possible failure points, which can be challenging, especially given that a customer may have many networking devices with different hardware configurations and/or firmware versions/builds. According to some aspects of the instant application, a device-onboarding emulating system 120 can be deployed at the customer's site to facilitate the customer in identifying and correcting potential issues related to the onboarding of networking devices. According to one aspect, device-onboarding emulating system 120 can be part of a sidecar monitoring system that includes a number of network sensors coupled to local network 112. According to an alternative aspect, device-onboarding emulating system 120 can include an independent application that runs on a computing device coupled to local network 112. Because the network sensors or the computing device running the application are coupled to local network 112 and Internet 114, device-onboarding emulating system 120 can detect any potential issues associated with local network 112 and Internet 114.

According to some aspects of the instant application, before a customer attempts the onboard a networking device, device-onboarding emulating system 120 can emulate the onboarding process of the networking device based on various device parameters, such as the device type and model, the media access control (MAC) address, the serial number, the firmware version/build, etc. In response to detecting a failure of the emulated onboarding process, device-onboarding emulating system 120 can perform a number of trouble-shooting operations to identify potential causes of the onboarding failure. Device-onboarding emulating system 120 can also display, on a user interface, the device-onboarding emulation results for a number of networking devices.

To emulate the onboarding of a networking device, device-onboarding emulating system 120 can interact with device-activation platform 110 as if it is a to-be-onboarded networking device. Each system can include various units for performing different functions associated with device onboarding, and the different units can interact with one another to achieve successful device onboarding.

In the example shown in FIG. 1, device-management platform 108 and device-activation platform 110 are shown as separate entities and may run on different computer server systems. In practice, device-management platform 108 and device-activation platform 110 may run on a single server or may reside in the cloud. It is also possible that device-management platform 108 and device-activation platform 110 are integrated into a single system that supports the activation and management of networking devices.

Figure 2A:
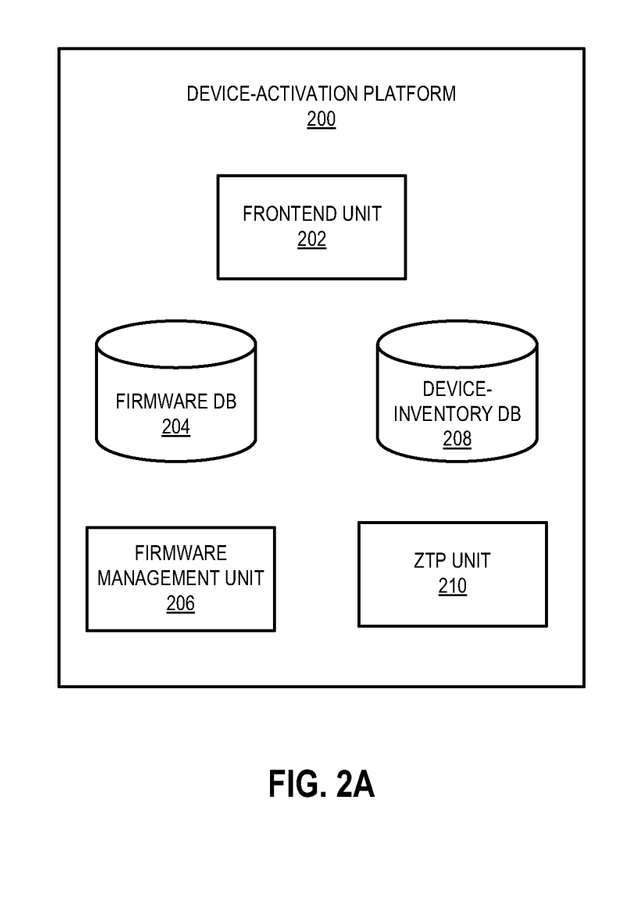
FIG. 2A illustrates an example block diagram of a device-activation platform, according to one aspect of the instant application.

FIG. 2A illustrates an example block diagram of a device-activation platform, according to one aspect of the instant application. Device-activation platform 200 can include a frontend unit 202, a firmware database 204, a firmware-management unit 206, a device-inventory database 208, and a ZTP unit 210.

Frontend unit 202 can provide a user interface to allow customers to access device-activation platform 200. For example, a customer can log into a user account to check the activation status of networking devices. According to alternative aspects, the user interface provided by frontend unit 202 can only be accessible by administrators of device-activation platform 200.

Firmware database 204 can store firmware that is applicable to different devices and of various versions. According to one aspect, firmware database 204 can store the firmware for each type/model of networking device. The stored firmware can include all versions that are compatible with the device-management platform or the software systems, including the most up-to-date version. Firmware-management unit 206 can be responsible for checking whether the firmware installed on a networking device matches the device type/model, is up to date, or is compatible with the device-management platform. If the firmware on the networking device needs to be upgraded, firmware-management unit 206 can obtain the correct version of firmware from firmware database 204 and send the obtained firmware to the networking device.

Device-inventory database 208 can maintain an inventory list for each customer. More specifically, each customer may be associated with a unique vendor-assigned customer identifier, and device-activation platform 200 can use such a unique identifier to identify each customer. When a customer places an order for networking devices, detailed information associated with each ordered device can be added to device-inventory database 208. The device information can include but is not limited to the device type (e.g., AP, gateway, switch, router, etc.), the device model, the serial number of the device, the MAC address of the device, the name and version number of the installed firmware, the device activation status, etc. According to some aspects of the instant application, a separate system managing the device-ordering process can send the device information to device-inventory database 208 via a Representational State Transfer (REST) Application Programming Interface (API). Note that an entry for a purchased networking device has its initial activation status set as "not yet activated." Once successfully activated or onboarded, the activation status can be updated to "activated." If the device-onboarding process encounters an error, the activation status can be updated to "onboarding error found."

ZTP unit 210 can be responsible for performing the standard device onboarding operations. For example, ZTP unit 210 can receive, from a networking device, a request to onboard the networking device to the device-management platform. Responsive to the request, ZTP unit 210 can exchange a number of handshake messages with the networking device to authenticate the networking device and send the appropriate instructions to the networking device to allow the networking device to connect to the management platform. For example, ZTP unit 210 can provide the URL of the management platform to the networking device.

Figure 2B:
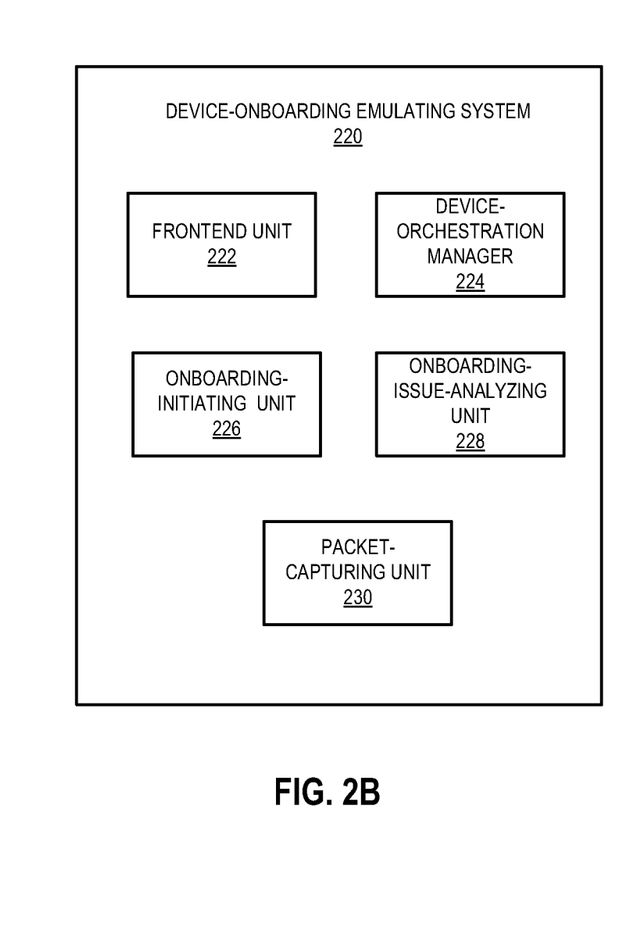
FIG. 2B illustrates an example block diagram of a device-onboarding emulating system, according to one aspect of the instant application.

FIG. 2B illustrates an example block diagram of a device-onboarding emulating system 220, according to one aspect of the instant application. Device-onboarding emulating system 220 can include a frontend unit 222, a device-orchestration manager 224, an onboarding-initiating unit 226, an onboarding-issue-analyzing unit 228, and a packet-capturing unit 230. Device-onboarding emulating system 220 may be installed and launched by the customer on a computing device coupled to the customer's local network before the customer attempts to onboard networking devices coupled to the same local network.

Frontend unit 222 can provide a user interface to allow customers to access device-onboarding emulating system 220. Note that a customer's account within device-onboarding emulating system 220 can be associated with the unique customer identifier assigned by the vendor. For example, each customer can use the unique customer identifier to establish a user account in device-onboarding emulating system 220. According to some aspects, the user interface can be a graphic user interface (GUI) that can facilitate the customer in selecting devices for emulation. The GUI can also be used to display the onboarding emulation result to the customer.

Device-orchestration manager 224 can be responsible for generating a device-orchestration list. According to some aspects, once a customer logs into the customer account, device-orchestration manager 224 can be triggered to send a device-inquiry message to device-activation platform 200. According to some aspects, the device-inquiry message can include identification information (e.g., user ID and password) associated with the customer to allow device-inventory database 208 within device-activation platform 200 to look up an inventory list corresponding to the customer. The inventory list can include records of all networking devices ever ordered by the customer. Each device record can include device information (e.g., device type, model, MAC address, serial No., firmware version, etc.) as well as the activation status of the device. In response to the device-inquiry message, device-activation platform 200 can send the inventory list of the customer to device-orchestration manager 224. Device-orchestration manager 224 can then assemble a device-orchestration list based on the received device-inventory list. The device-orchestration list can include devices that are not yet onboarded (or are not invisible) to the management system. In one example, the device-inventory list of a particular customer can include 50 wireless access points (APs) of various models. Among the 50 APs, 30 APs have been previously activated and are visible to the management platform, and the other 20 APs are to be onboarded to the management platform. Accordingly, device-orchestration manager 224 can generate a device-orchestration list that includes the 20 to-be-onboarded APs. Each entry in the device-orchestration list can include detailed information about the device, such as device type, model, MAC address, serial No., firmware version, etc.

Onboarding-initiating unit 226 can be responsible for initiating device-onboarding processes using the parameters of networking devices in the device-orchestration list. More specifically, for each device, onboarding-initiating unit 226 can exchange a sequence of handshake messages with the activation platform. According to some aspects, responsive to receiving a user command, onboarding-initiating unit 226 can emulate the onboarding process for a networking device by sending an onboarding-request message to the ZTP unit within the activation platform. The onboarding-request message can be generated based on the device parameters associated with the emulated device (i.e., a device on the device-orchestration list). Onboarding-initiating unit 226 can send the onboarding-request message to the activation platform via a network interface of the computing device hosting device-onboarding emulating system 220.

From the point of view of the ZTP unit receiving the onboarding-request message, the onboarding process is initiated by a networking device that is nearly identical to the emulated device, because both devices are coupled to the same local network and have the same device parameters (e.g., device type, model, MAC address, serial No., firmware version, etc.). Therefore, if the onboarding process initiated by onboarding-initiating unit 226 is successful, the actual onboarding of the emulated device will also be successful. On the other hand, if the onboarding process initiated by onboarding-initiating unit 226 encounters a problem (e.g., a network connectivity problem or a firmware version problem), the actual onboarding of the emulated device will face a similar problem.

If the emulated onboarding process for a particular networking device is completed successfully, onboarding-initiating unit 226 can receive a confirmation message (e.g., a "Welcome" message) from the management platform. Depending on the firmware version, the confirmation message may be slightly different from one networking device to another. According to some aspects, onboarding-initiating unit 226 can perform the onboarding emulating for each and every networking device in the device-orchestration list. For example, if there are 50 devices in the device-orchestration list, onboarding-initiating unit 226 can send 50 onboarding-request messages to the activation platform. If all onboarding processes are successful, onboarding-initiating unit 226 will receive 50 confirmation messages from the management platform.

Considering that devices of the same type, model, and firmware version may have similar onboarding behaviors, according to alternative aspects, the onboarding emulation can be performed for all different types/models of networking devices and all different firmware versions. For example, if the 50 networking devices on the device-orchestration list all have the same device type/model and are running the same firmware version (i.e., they are completely identical), instead of performing 50 device-onboarding emulations for the 50 networking devices, onboarding-initiating unit 226 can just emulate the onboarding process once (e.g., by sending one onboarding-request message to the activation platform). If the emulated onboarding process is successful, onboarding-initiating unit 226 can receive one confirmation message from the management platform. In a different example, the 50 networking devices may have the same device type/model but are running different firmware versions, with 20 devices running firmware version 1 and the other 30 devices running firmware version 2. Accordingly, onboarding-initiating unit 226 can emulate two onboarding processes using the same device type/model and two different firmware versions.

When there are multiple device types/models and multiple firmware versions among the to-be-onboarded devices, onboarding-initiating unit 226 can group these devices into different groups, with each group including devices with the same type/model and the same firmware version. Onboarding-initiating unit 226 can emulate the onboarding process for each group based on the device type/model and the firmware version.

According to some aspects, onboarding-initiating unit 226 may initiate the onboarding processes for multiple devices in series, meaning that onboarding-initiating unit 226 can perform the onboarding emulation for one device at a time. For example, onboarding-initiating unit 226 can send an onboarding-request message for one networking device on the device-orchestration list and wait for the confirmation message from the management platform. Onboarding-initiating unit 226 will send an onboarding-request message for a different networking device on the device-orchestration list after a confirmation message is received or after a predetermined time interval for receiving the confirmation message expires.

According to alternative aspects, onboarding-initiating unit 226 may initiate the onboarding processes for multiple networking devices in parallel, meaning that onboarding-initiating unit 226 can perform the onboarding emulation for multiple devices at the same time. For example, onboarding-initiating unit 226 can send multiple onboarding-request messages corresponding to multiple devices on the device-orchestration list simultaneously to the device-activation platform.

Onboarding-issue-analyzing unit 228 can be responsible for analyzing the potential cause or causes of an onboarding failure. When onboarding-initiating unit 226 fails to receive the confirmation message corresponding to an onboarding process after a predetermined time interval (e.g., a few seconds), onboarding-initiating unit 226 can send an onboarding-failure message along with the device information associated with the device experiencing the failure to onboarding-issue-analyzing unit 228. According to some aspects, in response to receiving the onboarding-failure message, onboarding-issue-analyzing unit 228 can conduct a series of diagnostic tests based on the received device information (e.g., device model and firmware version).

According to some aspects, the series of diagnostic tests can include at least a local network connectivity test, a gateway-reachability test, an ARP test, a DNS test, a firmware test, a protocol test, a management platform test, etc.

To test the local network connectivity, onboarding-issue-analyzing unit 228 can determine whether the computing device running the device-onboarding emulation application can obtain a valid Internet protocol (IP) address. Failing to obtain a valid IP address may indicate that the local network is experiencing connectivity problems, or the network interface of the computing device is faulty. Additional issues associated with the local network may be caused by the default gateway router of the local network being faulty. Onboarding-issue-analyzing unit 228 can also determine whether the default gateway is reachable and/or whether the ARP server for the default gateway is functioning correctly.

Onboarding-issue-analyzing unit 228 can also perform the DNS test by determining whether the DNS resolutions for the activation platform and the management platform are successful. According to one aspect, onboarding-issue-analyzing unit 228 can apply a DNS checking tool against the URLs of the activation platform and the management platform. Onboarding-issue-analyzing unit 228 can also determine if the DNS server in the network is functioning correctly.

Onboarding-issue-analyzing unit 228 can determine whether the current firmware installed in the emulated device matches the device type/model and is compatible with the management platform. If the firmware is not compatible (e.g., it does not meet the minimum requirement), onboarding-issue-analyzing unit 228 can also check whether the firmware depository (e.g., firmware database 204 in device-activation platform 200) can provide the needed firmware upgrade to the networking device (i.e., whether the networking device can access the firmware depository and download the firmware upgrade).

If the device passes the firmware test (i.e., it has the correct firmware version or the firmware upgrade is successful), onboarding-issue-analyzing unit 228 can perform a protocol test to determine whether there is a protocol error in the activation platform. More specifically, onboarding-issue-analyzing unit 228 can determine whether the correct URL for the management platform is provided to the device.

Onboarding-issue-analyzing unit 228 can also determine whether the management platform is functioning correctly. In one example, onboarding-issue-analyzing unit 228 can ping the server hosting the management platform. In another example, onboarding-issue-analyzing unit 228 can send an onboarding-request message using the hardware/firmware parameters of the computing device running the device-onboarding emulation application to check whether it can receive a confirmation message.

Onboarding-issue-analyzing unit 228 can summarize the results of the series of diagnostic tests to determine the root cause of the onboarding failure. In most cases, the onboarding failure may be caused by a single reason (e.g., the DNS or ARP error, the inability to upgrade the firmware, the local network failure, the server failure at the activation or management platform, etc.). In some cases, there may also be multiple reasons that cause the onboarding failure. In some embodiments, each particular reason that may lead to the onboarding failure can be mapped to a unique onboarding-issue identifier (ID) that can be presented to the customer. In one example, the onboarding-issue ID can be numerical. In a further example, a three-digit number (e.g., 001, 002, etc.) can be used to represent a particular onboarding-issue ID.

Packet-capturing unit 230 can be responsible for capturing packets sent and received by device-onboarding emulating system 200 during the onboarding emulation process. According to some aspects, when determining the root cause of the onboarding failure, onboarding-issue-analyzing unit 228 can also perform analysis on the captured packets. For example, a response packet from the management platform may indicate that the management platform encounters certain failures. According to further aspects, packet-capturing unit 230 may apply a number of filters (e.g., filters based on destination addresses) to ensure that it only captures packets associated with the onboarding process (including the series of diagnostic tests). The captured packets can be packed with the results of the diagnostic tests to be presented to the customer.

Figure 3:
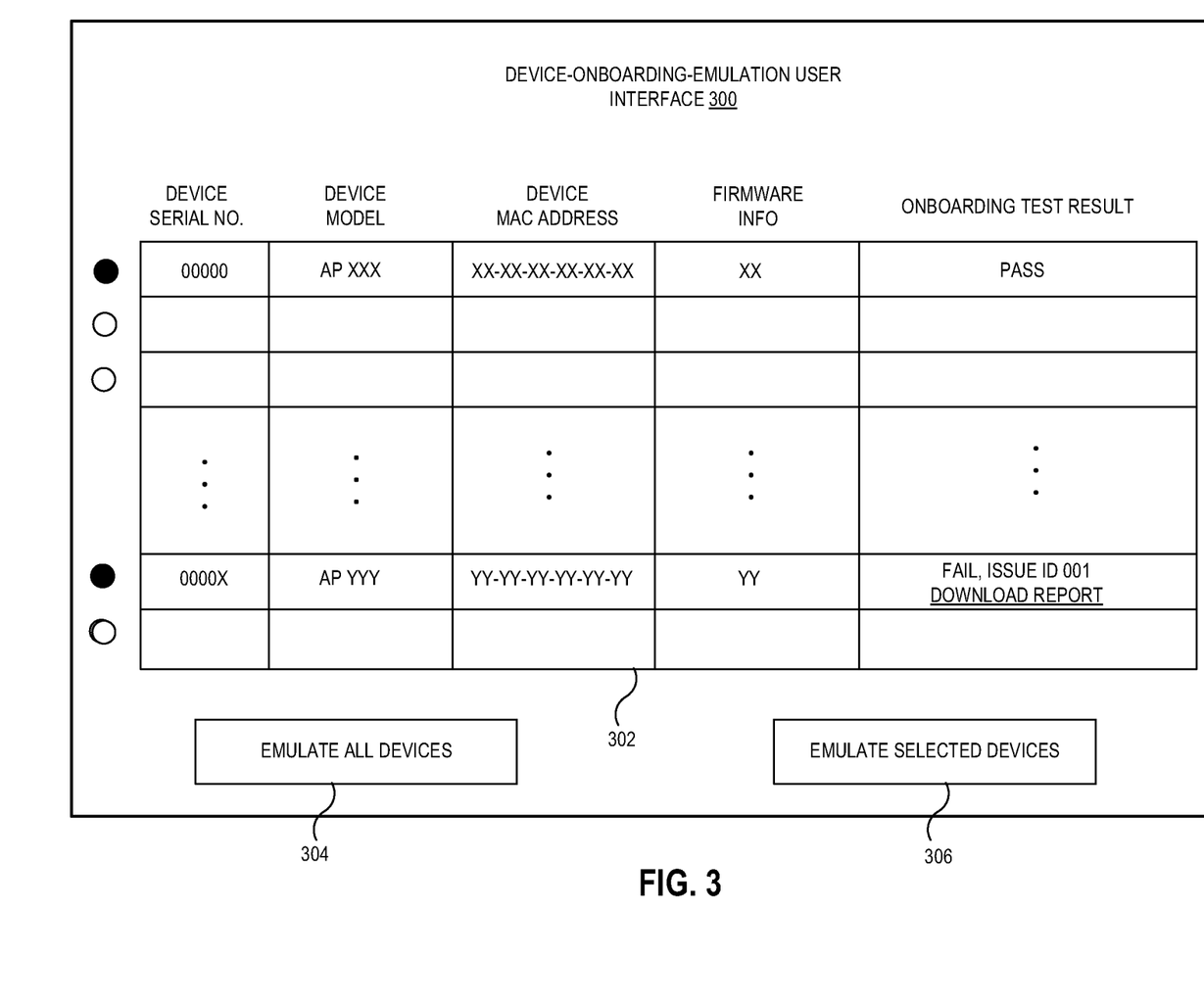
FIG. 3 presents an example of a graphic user interface (GUI), according to one aspect of the instant application.

FIG. 3 presents an example of a graphic user interface (GUI), according to one aspect of the instant application. Device-onboarding-emulation user interface 300 can include a device table 302, an emulate-all-device button 304, and an emulate-selected-device button 306.

Device table 302 can include a number of entries, with each entry corresponding to a to-be-onboarded networking device. Each table entry can include information about the device hardware (e.g., the device serial number, device type/model, device MAC address, etc.) and information about the device firmware (e.g., firmware version).

The customer can select a number of networking devices for onboarding emulation and click button 306 to emulate the onboarding processes of the selected networking devices. Alternatively, the customer can click button 304 to emulate the onboarding processes for all networking devices in device table 302. As discussed previously, the emulation can be performed for each individual networking device or each group of identical networking devices (i.e., networking devices with the same device type/model and firmware version). When emulating the device onboarding, the emulation system can sequentially send one onboarding-request message for each device or each group of identical devices to the activation platform.

The device-onboarding emulation result can be presented in table 302 for each networking device. According to some aspects, the emulation result can indicate whether the networking device passes or fails the onboarding test. More specifically, if the emulated onboarding process for a particular networking device can result in a confirmation message from the management platform, the particular networking device is said to pass the onboarding test. If the networking device fails to pass the onboarding test (e.g., no confirmation message is received after a predetermined timeout period), the emulation result can include one or more onboarding-issue IDs associated with the failed onboarding test. In the example shown in FIG. 3, the displayed emulation result for a failed test can also provide a link for the customer to download a detailed onboarding-failure report that includes the analysis of the root cause of the onboarding failure and may also include the captured packets.

Figure 4A:
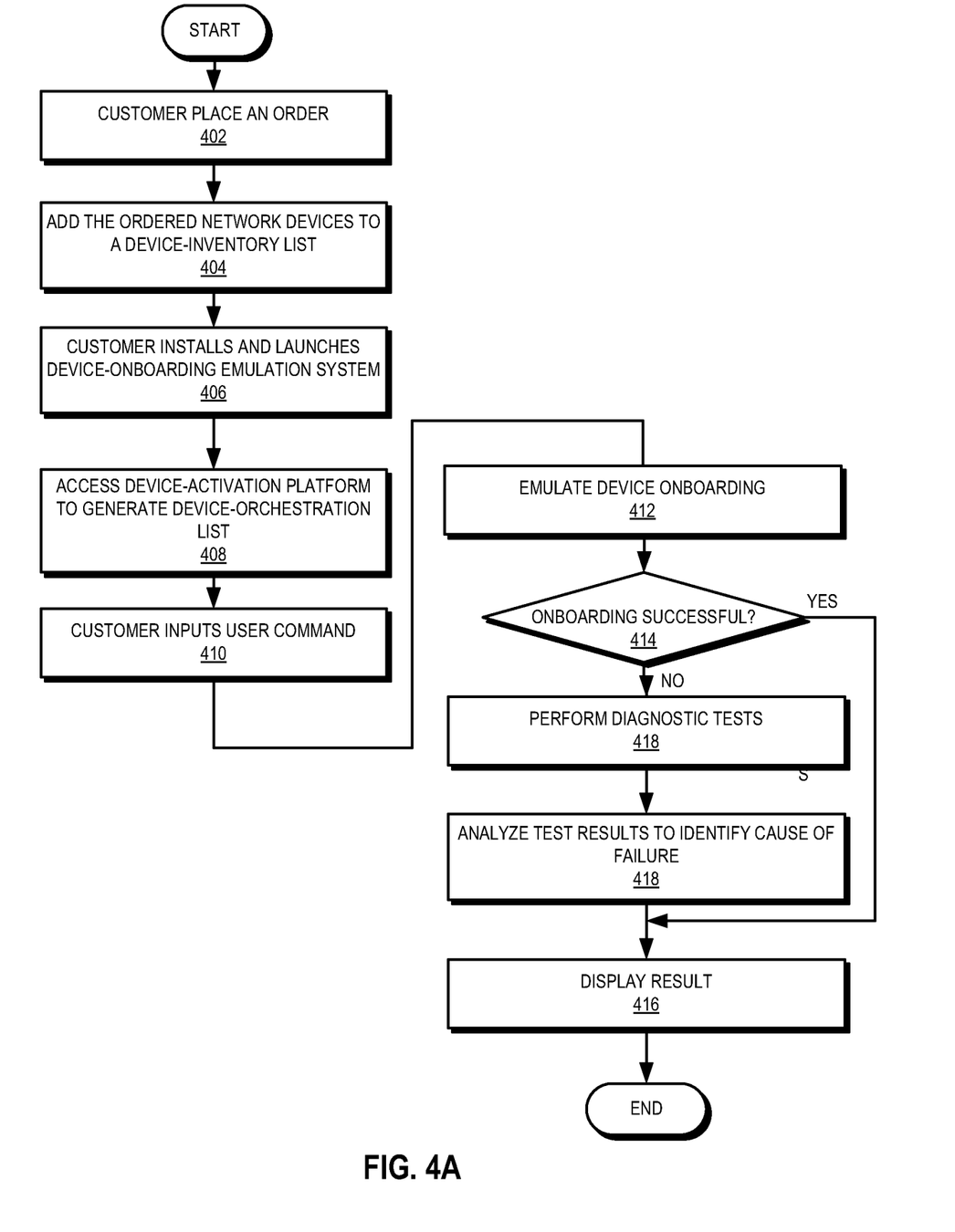
FIG. 4A presents a flowchart illustrating an example of an onboarding emulation process, according to one aspect of the instant application.

FIG. 4A presents a flowchart illustrating an example of an onboarding emulation process, according to one aspect of the instant application. During operation, a customer places an order for a number of networking devices (operation 402). Device parameters of the ordered networking devices can be sent to the device-activation platform and added to a device-inventory list for the customer in the device inventory database maintained by the device-activation platform (operation 404). Each device record can include information about the device hardware (e.g., type and model, serial number, MAC address, etc.) and information about the firmware (e.g., version No.) installed on the device.

These networking devices can be deployed to the customer's local network. Before onboarding the networking devices to the management platform, the customer may wish to test whether these networking devices can be onboarded successfully and to perform necessary diagnostic tests if one or more networking devices encounter onboarding failure. To do so, the customer can install and launch the device-onboarding emulation system on a computing system within the same local network as those to-be-onboarded networking devices (operation 406). For example, the customer can install the device-onboarding emulation system on a personal computer (PC) or a laptop computer that is coupled to the same local network to which the to-be-onboarded networking devices are deployed.

The device-onboarding emulation system can then access the device-activation platform to obtain the device inventory list and generate a device-orchestration list (operation 408). The device-orchestration list can include the to-be-onboarded networking devices of the customer and can be displayed on a user interface to allow the customer to select a number of networking devices for onboarding emulation. According to one aspect, the to-be-onboarded networking devices can be grouped based on the device type/model and firmware version. Networking devices of the same type and model and are installed with the same firmware version can be grouped together.

The customer can input a user command for performing the onboarding emulation (operation 410). For example, the customer can click button 304 or button 306 in device-onboarding-emulation user interface 300 to initiate the emulation of the onboarding process for all networking devices or selected networking devices, respectively. Responsive to the user command, the emulation system can perform the device-onboarding emulation using various parameters associated with the emulated devices (operation 412). For example, the emulation system can send a sequence of onboarding-request messages to the activation platform to exchange handshake messages with the onboarding-request system. Each onboarding-request message can correspond to a networking device or a group of networking devices of the same type/model and firmware version. The onboarding-request message can include information about the device hardware (e.g., type/model, serial number, MAC address, etc.) and information about the device firmware (e.g., firmware version).

For each emulated onboarding process, the emulation system can
determine whether the onboarding is successful (operation 414). More specifically, the emulation system can determine whether a confirmation message responsive to a particular onboarding-request message can be received from the management platform within a predetermined time interval. If so, the particular onboarding emulation is considered successful, and the emulation system displays the result in the GUI (operation 416). If the particular onboarding emulation fails, the emulation system can perform a series of diagnostic tests (operation 418). The diagnostic tests can include but are not limited to a local network connectivity test, a gateway-reachability test, a test on the ARP server, a test on the DNS server, a test on whether the firmware upgrade is available when needed, a test on whether the activation platform contains a protocol error, a test on whether the management platform encounters a failure, etc. According to some aspects, performing the diagnostic tests can include sending query packets to the default gateway, the ARP server, the DNS server, the activation platform, the management platform, etc. Performing the diagnostic tests can also include capturing packets associated with the emulated onboarding process and the diagnostic tests.

The emulation system can further analyze the results of the diagnostic tests and the captured packets to identify the possible cause or causes of the onboarding failure (operation 420). The emulation system can then display the result of failure analysis in the GUI (operation 416). According to some aspects of the instant application, each cause (e.g., local network connectivity issue, DNS issue, ARP issue, firmware server issue, activation server issue, management server issue, etc.) can be mapped to an onboarding-issue ID, which is displayed in the GUI. According to further aspects, the GUI can also provide a link to allow the customer to download a detailed failure report file that includes the failure analysis and the captured packets.

If the onboarding emulation for a particular networking device is successful, the customer can perform the actual onboarding of the networking device (i.e., power on the device and connect it to the network). Note that if the actual onboarding fails, it is most likely that the networking device has failed components (e.g., a faulty network interface card). If the onboarding emulation for a particular networking device is unsuccessful, the customer can take remedial actions based on the failure report. For example, the failure may be caused by the inability to obtain the proper firmware upgrade, and the customer can contact the device vendor to request the upgrade file. If the failure is caused by connectivity issues in the local network, the customer then needs to fix those connectivity issues before onboarding the network device. Similarly, for ARP or DNS issues, the customer may need to resolve those issues before onboarding the networking device.

Figure 4B:
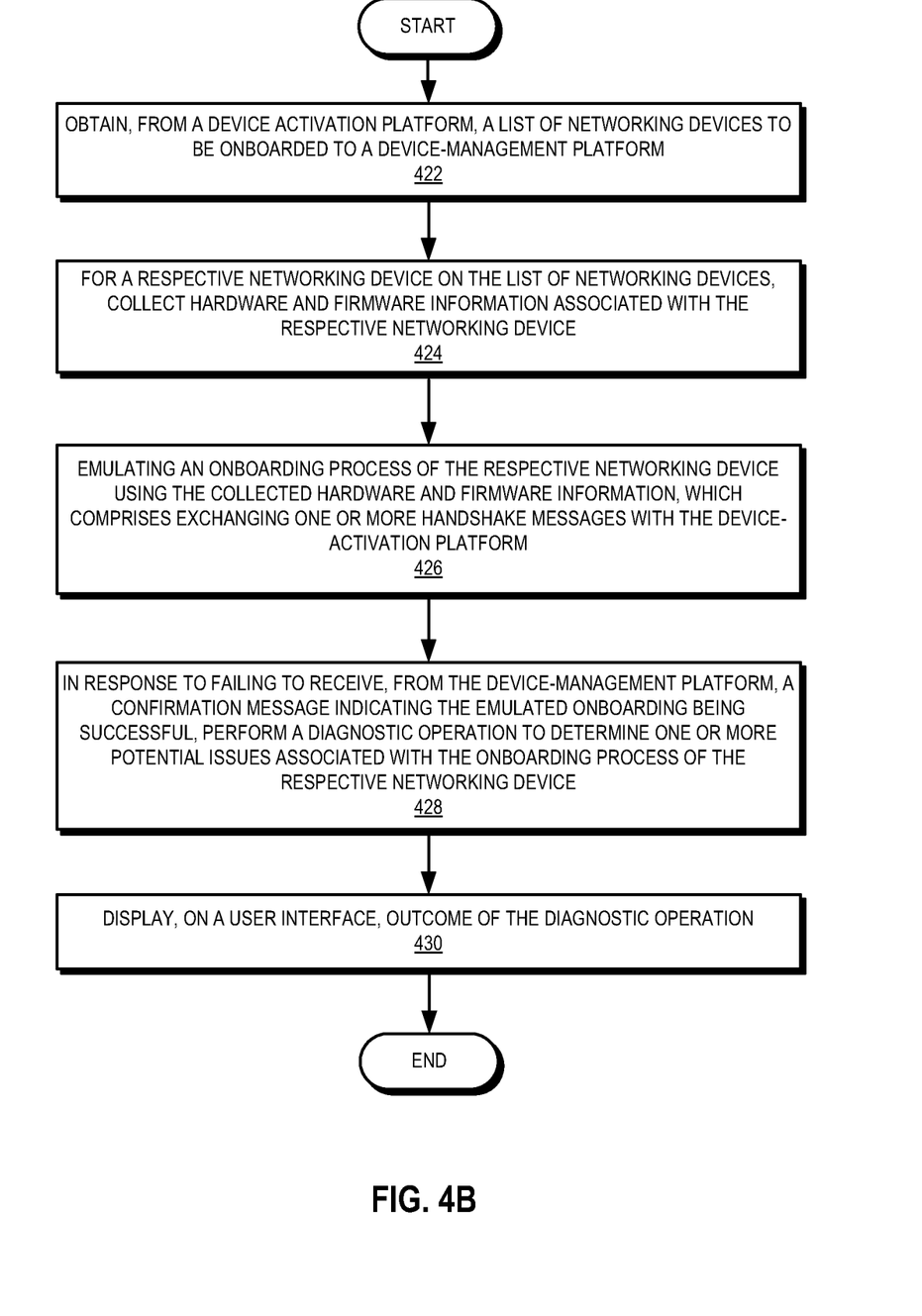
FIG. 4B presents a flowchart illustrating example onboarding-emulation operations performed by a computing device, according to one aspect of the instant application.

FIG. 4B presents a flowchart illustrating example onboarding-emulation operations performed by a computing device, according to one aspect of the instant application. During operation, a computing device can obtain, from a device-activation platform, a list of networking devices to be onboarded to a device-management platform (operation 422). The device-activation platform can gather customer inventory information using various methods. In one example, the device-activation platform can receive a report from a centralized device-purchasing system that tracks networking devices purchased by all customers. The report can specify the customer identifier, the type/model of the device, the serial number and MAC address of the device, the version of the firmware/software installed on the device, etc. In another example, the device-activation platform can also receive the customer inventory information from the customer.

For a respective networking device on the list of networking devices, the computing device can collect hardware and firmware information associated with the respective networking device (operation 424). In one example, the computing device can maintain a list of to-be-onboarded networking devices, and collecting the hardware and firmware information associated with a networking device can include performing a lookup based on the serial number of a networking device.

The computing device can emulate the onboarding process of the respective networking device using the collected hardware and firmware information, which comprises exchanging one or more handshake messages with the device-activation platform (operation 426). For example, the computing device can send an onboarding request message to the device-activation platform on behalf of the networking device.

In response to failing to receive, from the device-management platform, a confirmation message indicating the emulated onboarding process being successful, the computing device can perform a diagnostic operation to determine one or more potential issues associated with the onboarding process of the respective networking device (operation 428). The computing device can further display the outcome of the diagnostic operation on a user interface (operation 430).

Although the example process in FIGS. 4A-4B shows a specific order of performing certain operations, the methods are not limited to such order. For example, the operations shown in succession in the flowchart may be performed in a different order, may be executed concurrently, or with partial concurrence or combinations thereof.

Figure 5:
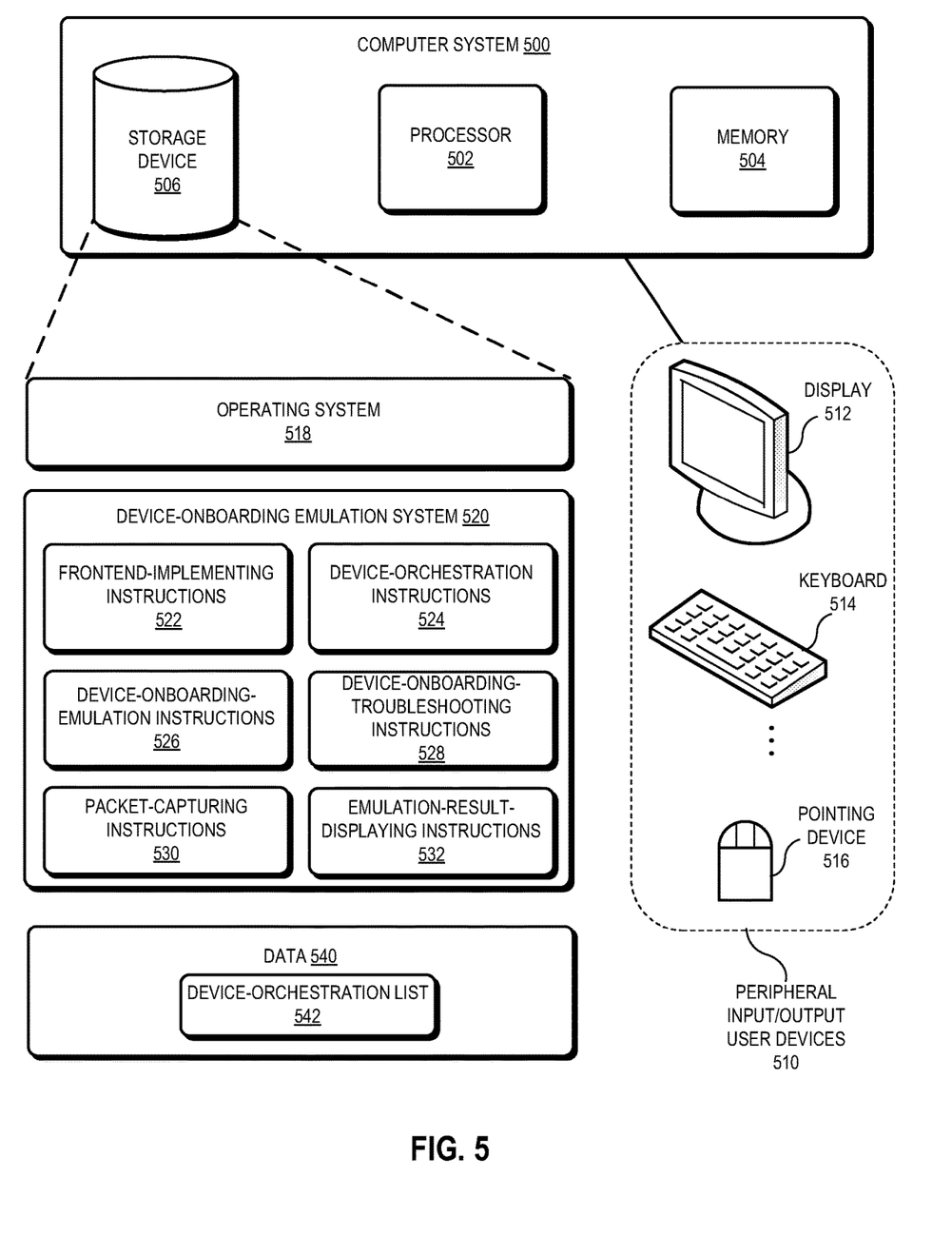
FIG. 5 illustrates an example of a computer system that facilitates device-onboarding emulation, according to one aspect of the instant application.

FIG. 5 illustrates an example of a computer system that facilitates device-onboarding emulation, according to one aspect of the instant application. Computer system 500 can include a processor 502, a memory 504, and a storage device 506. Furthermore, computer system 500 can be coupled to peripheral input/output (I/O) user devices 510, e.g., a display device 512, a keyboard 514, and a pointing device 516. Storage device 516 can store an operating system 518, a device-onboarding emulation system 520, and data 540.

Device-onboarding emulation system 520 can include instructions, which when executed by computer system 500, can cause computer system 500 or processor 502 to perform methods and/or processes described in this disclosure. Specifically, by executing these instructions, computer system 500 can achieve the goal of emulating the device-onboarding processes for a number of networking devices and identifying the most likely cause of an onboarding failure. Device-onboarding emulation system 520 can include instructions for implementing a frontend (frontend-implementing instructions 522), instructions for generating a device-orchestration list based on a device-inventory list maintained by the device-activation platform (device-orchestration instructions 524), instructions for emulating the device-onboarding processes for a plurality of devices or a plurality of device groups (device-onboarding-emulation instructions 526), instructions for troubleshooting the onboarding process in the event of onboarding failure (device-onboarding-troubleshooting instructions 528), instructions for capturing network packets during the onboarding emulation (packet-capturing instructions 530), and instructions for displaying the emulation result (emulation-result-displaying instructions 532). Data 540 can include a device-orchestration list 542.

In general, the disclosure describes a mechanism to emulate the onboarding process of networking devices. More specifically, before the actual onboarding of networking devices (e.g., APs, gateways, switches, routers, etc.) to a device-management platform provided by the device vendor, the customer can launch a device-onboarding-emulation application on a computing device (e.g., a PC or laptop computer) within the customer's local network. The device-onboarding-emulation application can obtain a list of networking devices purchased by the customer and generate an orchestrion-device list comprising a plurality of to-be-onboarded devices. Each entry in the orchestrion-device list corresponds to a to-be-onboarded networking device and can include information about the device hardware (e.g., device type and model, serial number, MAC address, etc.) and information about the device firmware (e.g., firmware version). For each device or each device group with a unique combination of device model and firmware version, the device-onboarding-emulation application can emulate the device onboarding process using the device hardware and firmware information. The device-onboarding-emulation application can exchange handshake messages with a device activation platform on behalf of each emulated device or device group. A successful emulation can result in the device-management platform sending a confirmation message to the device-onboarding-emulation application. The emulation is considered failed if such a confirmation message cannot be received after a predetermined interval. In response to a failed onboarding emulation, the device-onboarding-emulation application can perform a series of diagnostic tests (e.g., a test of connectivity in the local network, an ARP test, a DNS test, a firmware test, tests on the servers, etc.) and analyze the test results to identify the most likely cause of the onboarding failure. The device-onboarding-emulation application can present the failure analysis to the customer via a GUI. The device-onboarding-emulation application can also interface with a packet-capturing application to capture a number of network packets associated with the onboarding-emulation process, including the troubleshooting process. The captured network packets can also be analyzed along with the diagnostic test results to enhance the accuracy of the diagnosis. Note that if the emulated onboarding process for a networking device is successful but the networking device encounters onboarding failure, it is very likely that the onboarding failure is caused by faulty hardware components (e.g., a malfunctioning network interface card or NIC) on the networking device.

One aspect of the instant application can provide a system and method for emulating the onboarding of networking devices. During operation, a computing device can obtain from a device-activation platform a list of networking devices to be onboarded to a device-management platform method. For a respective networking device on the list of networking devices, the system can collect hardware and firmware information associated with the respective networking device and emulate an onboarding process of the respective networking device using the collected hardware and firmware information, which comprises exchanging one or more handshake messages with the device-activation platform. In response to failing to receive, from the device-management platform, a confirmation message indicating the emulated onboarding process being successful, the system can perform a diagnostic operation to determine one or more potential issues associated with the onboarding process of the respective networking device and display, on a user interface, outcome of the diagnostic operation.

In a variation on this aspect, the hardware information can include one or more of: a device type; a device model; a serial number; and a media access control (MAC) address.

In a variation on this aspect, the firmware information comprises a firmware version number.

In a variation on this aspect, the system can select, from the list of to-be-onboarded networking devices, a subset of networking devices, and emulate the onboarding processes of the selected subset of networking devices.

In a further variation, emulating the onboarding processes of the selected subset of networking devices can include sequentially sending a set of onboarding-request messages corresponding to the selected subset of networking devices to the device-activation platform.

In a further variation, emulating the onboarding processes of the selected subset of networking devices can include sending, in parallel, a set of onboarding-request messages corresponding to the selected subset of networking devices to the device-activation platform.

In a variation on this aspect, performing the diagnostic operation comprises conducting a series of tests comprising one or more of: a connectivity test on a local network to which the networking device is coupled; a reachability test on a default gateway of the local network; a test on an address resolution protocol (ARP) server; a test on a domain name system (DNS) server; a test on whether a firmware upgrade is available; a test on whether the device-activation platform contains a protocol error; and a test on whether the device-management platform encounters a failure.

In a further variation, performing the diagnostic operation can further include capturing incoming and outgoing communication packets during the diagnostic operation.

In a further variation, determining the one or more potential issues can include analyzing results of the series of tests and the captured communication packets.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The above description is presented to enable any person skilled in art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be any electronic, magnetic, optical, or other physical storage apparatus to contain or store information such as executable instructions, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer-readable storage medium described herein may be non-transitory.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method, comprising:
   obtaining, by a computing device from a device-activation platform, a list of networking devices to be onboarded to a device-management platform;
   for a respective networking device on the list of networking devices, collecting hardware and firmware information associated with the respective networking device;
   emulating an onboarding process of the respective networking device using the collected hardware and firmware information, which comprises exchanging one or more onboarding-request messages with the device-activation platform;
   in response to failing to receive, from the device-management platform, a confirmation message indicating the emulated onboarding process being successful, performing a diagnostic operation to determine one or more potential issues associated with the emulated onboarding process of the respective networking device; and
   displaying, on a user interface, outcome of the performed diagnostic operation.

2. The method of claim 1,
   wherein the device-activation platform is to access a centralized device-purchasing system that tracks networking devices purchased by customers to obtain inventory information associated with each respective customer; and
   wherein obtaining the list of the to-be-onboarded networking devices comprises accessing the obtained inventory information associated with the respective customer.

3. The method of claim 1,
   wherein the collected hardware information comprises one or more of:
      a device type;
      a device model;
      a serial number; and
      a media access control (MAC) address; and
   wherein the collected firmware information comprises a firmware version number.

4. The method of claim 1, further comprising:
   selecting, from the list of to-be-onboarded networking devices, a subset of networking devices; and
   emulating the onboarding processes of the selected subset of networking devices, including sending a set of onboarding-request messages corresponding to the selected subset of networking devices to the device-activation platform.

5. The method of claim 4, wherein the set of onboarding-request messages are sent sequentially.

6. The method of claim 4, wherein the set of onboarding-request messages are sent in parallel.

7. The method of claim 1, wherein performing the diagnostic operation comprises conducting a series of tests comprising one or more of:
   a connectivity test on a local network to which the respective networking device is coupled;
   a reachability test on a default gateway of the local network;
   a test on an address resolution protocol (ARP) server;
   a test on a domain name system (DNS) server;
   a test on whether a firmware upgrade is available;
   a test on whether the device-activation platform contains a protocol error; and
   a test on whether the device-management platform encounters a failure.

8. The method of claim 7, wherein performing the diagnostic operation further comprises capturing incoming and outgoing communication packets during the diagnostic operation.

9. The method of claim 8, wherein determining the one or more potential issues comprises analyzing results of the series of tests and the captured incoming and outgoing communication packets.

10. A computer system, comprising:
    a processor; and
    a storage device storing instructions executable by the processor to:
       obtain, from a device-activation platform, a list of networking devices to be onboarded to a device-management platform;
       for a respective networking device on the list of networking devices, collect hardware and firmware information associated with the respective networking device;
       emulate an onboarding process of the respective networking device using the collected hardware and firmware information, which comprises exchanging one or more onboarding-request messages with the device-activation platform;
       in response to failing to receive, from the device-management platform, a confirmation message indicating the emulated onboarding process being successful, perform a diagnostic operation to determine one or more potential issues associated with the emulated onboarding process of the respective networking device; and
       display, on a user interface, outcome of the performed diagnostic operation.

11. The computer system of claim 10,
    wherein the device-activation platform is to access a centralized device-purchasing system that tracks networking devices purchased by customers to obtain inventory information associated with each respective customer; and
    wherein the instructions to obtain the list of the to-be-onboarded networking devices comprise instructions executable to access the obtained inventory information associated with the respective customer.

12. The computer system of claim 10,
    wherein the collected hardware information comprises one or more of:
       a device type;
       a device model;
       a serial number; and
       a media access control (MAC) address; and
    wherein the collected firmware information comprises a firmware version number.

13. The computer system of claim 10, wherein the instructions are executable to:
    select, from the list of to-be-onboarded networking devices, a subset of networking devices; and
    emulate the onboarding processes of the selected subset of networking devices, including sending a set of onboarding-request messages corresponding to the selected subset of networking devices to the device-activation platform.

14. The computer system of claim 13, wherein the set of onboarding-request messages are sent in parallel.

15. The computer system of claim 10, wherein performing the diagnostic operation comprises conducting a series of tests comprising one or more of:
- a connectivity test on a local network to which the respective networking device is coupled;
- a reachability test on a default gateway of the local network;
- a test on an address resolution protocol (ARP) server;
- a test on a domain name system (DNS) server;
- a test on whether a firmware upgrade is available;
- a test on whether the device-activation platform contains a protocol error; and
- a test on whether the device-management platform encounters a failure.

16. The computer system of claim 15, wherein the instructions to perform the diagnostic operation comprise instructions to capture incoming and outgoing communication packets during the diagnostic operation.

17. The computer system of claim 16, wherein the instructions to determine the one or more potential issues comprise instructions to analyze results of the series of tests and the captured incoming and outgoing communication packets.

18. A non-transitory computer-readable storage medium storing instructions executable by a processor to:
- obtain, from a device-activation platform, a list of networking devices to be onboarded to a device-management platform;
- for a respective networking device on the list of networking devices, collect hardware and firmware information associated with the respective networking device;
- emulate an onboarding process of the respective networking device using the collected hardware and firmware information, which comprises exchanging one or more onboarding-request messages with the device-activation platform;
- in response to failing to receive, from the device-management platform, a confirmation message indicating the emulated onboarding process being successful, perform a diagnostic operation to determine one or more potential issues associated with the emulated onboarding process of the respective networking device; and
- display, on a user interface, outcome of the performed diagnostic operation.

19. The non-transitory computer-readable storage medium of claim 18, wherein the instructions to perform the diagnostic operation comprise instructions to conduct a series of tests comprising one or more of:
- a connectivity test on a local network to which the respective networking device is coupled;
- a reachability test on a default gateway of the local network;
- a test on an address resolution protocol (ARP) server;
- a test on a domain name system (DNS) server;
- a test on whether a firmware upgrade is available;
- a test on whether the device-activation platform contains a protocol error; and
- a test on whether the device-management platform encounters a failure.

20. The non-transitory computer-readable storage medium of claim 18, wherein the instructions are executable to:
- select, from the list of to-be-onboarded networking devices, a subset of networking devices; and
- emulate the onboarding processes of the selected subset of networking devices, including sending a set of onboarding-request messages corresponding to the selected subset of networking devices to the device-activation platform.

* * * * *